United States Patent

Baudu et al.

[11] Patent Number: 5,997,054
[45] Date of Patent: Dec. 7, 1999

[54] DEVICE FOR CLOSING AND LOCKING THE SHUTTERS OF A THRUST REVERSER

[75] Inventors: Pierre André Marcel Baudu, Le Havre; Patrick Gonidec, Montivilliers; Pascal Gérard Rouyer, Saint Aubin Routot; Guy Bernard Vauchel, Le Havre, all of France

[73] Assignee: Societe Hispano-Suiza Aerostructures, Paris, France

[21] Appl. No.: 09/053,501

[22] Filed: Apr. 2, 1998

[30] Foreign Application Priority Data

Apr. 3, 1997 [FR] France .................................. 97 04049

[51] Int. Cl.⁶ ....................................................... E05C 3/06
[52] U.S. Cl. ................. 292/201; 292/341.16; 292/341.17
[58] Field of Search ..................................... 292/201, 199, 292/341.16, 341.17; 244/110 B; 60/226.2

[56] References Cited

U.S. PATENT DOCUMENTS

| | | | |
|---|---|---|---|
| 3,600,023 | 8/1971 | Gudde | 292/201 |
| 3,926,460 | 12/1975 | Peterson | 292/144 |
| 4,099,752 | 7/1978 | Geringer | 292/144 |
| 4,395,000 | 7/1983 | Deviny et al. | 244/118 |
| 4,418,950 | 12/1983 | Penhasi | 292/144 |
| 4,437,783 | 3/1984 | Halin et al. | 292/201 |
| 4,796,932 | 1/1989 | Tame | 292/112 |
| 4,956,992 | 9/1990 | Undin | 72/451 |
| 5,037,145 | 8/1991 | Wilkes | 292/201 |
| 5,224,342 | 7/1993 | Lair | 60/230 |
| 5,437,173 | 8/1995 | Spinar | 70/89 |
| 5,524,431 | 6/1996 | Brusson et al. | 60/226.2 |
| 5,735,557 | 4/1998 | Harvey | 292/216 |

FOREIGN PATENT DOCUMENTS

| | | |
|---|---|---|
| 0 075 746 A1 | 4/1983 | European Pat. Off. . |
| 0 313 454 A1 | 4/1989 | European Pat. Off. . |
| 2 726 849 | 5/1996 | France . |
| 2-100857 | 4/1990 | Japan . |

*Primary Examiner*—Darnell M. Boucher
*Assistant Examiner*—John B. Walsh
*Attorney, Agent, or Firm*—Oblon, Spivak, McClelland, Maier & Neustadt, P.C.

[57] ABSTRACT

A device for closing and locking the shutters of an aircraft thrust reverser includes a lock having a latch which is motorized so as to complete the closure of a shutter utilizing energy supplied by the motor, thereby relieving the jack which is the prime mover of the shutter. The device includes a stop which opposes the latch and interacts with a counter-stop so as to immobilize the shutter in the closed position and thus reduce vibration and flapping of the shutter.

22 Claims, 6 Drawing Sheets

DEVICE FOR CLOSING AND LOCKING THE SHUTTERS OF A THRUST REVERSER

BACKGROUND OF THE INVENTION

1. Field of the Invention

The invention relates to aircraft thrust reversers, and more particularly to a device for closing the shutters of such a thrust reverser and locking them in the closed position.

A thrust reverser forms a thin and substantially annular structure surrounding a turboshaft engine of the aircraft and centred on the geometric axis of the engine. More particularly, a thrust reverser comprises a fixed structure surrounding the engine and defining a plurality of radial apertures which can be closed or opened by movable shutters. When the shutters are closed, the function of the thrust reverser is to channel rearwards the flow of propulsion gases generated by the engine. When the shutters are open, the propulsion gases pass through the radial apertures and are diverted forwards, which diversion produces the thrust reversal.

2. Summary of the Prior Art

Each shutter is usually closed by at least one jack which is housed in the thickness of the reverser structure, one end of the jack being attached to the fixed structure, while its other end is attached to the shutter. The shutter is maintained in its closed position by at least one lock which is usually integral with the fixed structure. This lock comprises a movable latch which retains the shutter by means of a locking interface integral with the shutter. It will be noted that the lock instead may be integral with the shutter, and that in this case the locking interface will be integral with the fixed structure. The locking interface usually comprises a roller rotatably mounted at the end of a tie rod, and the latch of the lock acts on the roller to retain the shutter in its closed position.

When the jack is operated to close the shutter and the shutter approaches its closed position, the jack has to exert a substantial additional traction force in order to:

- bring the shutter onto bearing surfaces ensuring precise positioning of the said shutter near the closed position,
- compress sealing gaskets which are generally of an elastomeric material and which are arranged between the periphery of the shutter and the fixed structure,
- trigger the lock of the shutter, which is usually of the passive type in that the latch of the lock is brought mechanically into the closed position by the movement of the locking interface which is carried by the shutter and which comes into engagement with the latch to move it into its closed position, the latch then locking itself automatically in the closed position by means of a spring and cam mechanism,
- "over-retract" the shutter, that is to say slightly overshoot the closed position of the shutter so as to allow automatic locking of the latch, the "over-retraction" temporarily entailing further compression of the sealing gaskets between the shutter and the fixed structure. This additional force requires strengthening of the jack, of the fixed structure and of the shutter, all of which increases the mass and cost of the thrust reverser.

Furthermore, the additional force has to be exerted under very unfavourable conditions in the case of thrust reversers of the well known type referred to as "pivoting-door" reversers. In such reversers, each radial aperture is shut off by a shutter, called a "door", which is pivotally mounted in the fixed structure so that the pivoting usually takes place in a plane including the geometric axis of the reverser. What happens, in this case, is that, when the shutter nears the closed position, the geometric axis of the jack approaches the geometric pivot axis of the shutter, such that the jack has to exert a very substantial additional force in order to produce only a reduced pivoting torque on the shutter.

Also, the additional force has to be further augmented in the case of reversers whose pivoting shutters are referred to as "self-opening". This is because the shutters in such thrust reversers tend to open naturally under the effect of the pressure of the propulsion gases generated by the turboshaft engine, this arising from the offset position of the pivots, and the jacks have to supply an additional force to overcome this tendency.

A first problem to be solved, therefore, is that of reducing the force required to be exerted by the jacks near the closed position of the shutters.

Another problem with known thrust reversers is that as soon as a shutter is closed and locked, its jack is disabled. The shutter is consequently relaxed and can start to vibrate or flap under the combined effect of the vibration transmitted from the engine to the reverser, and of the turbulent flow of the ambient air and of the propulsion gases at the ends of the shutter. This vibration or flapping of the shutter causes hammering and accelerated wear of the locking members, particularly the latch and the locking interface.

Thrust reversers with pivoting shutters are more exposed to this phenomenon because the forward ends of the shutters constitute leading edges exposed to the flow of ambient air or of the propulsion gases. The flapping occurs mainly at low engine speeds, when the pressure of the propulsion gases is insufficient to press the locking interface of the shutter against the latch of the lock.

Thus, a second problem to be solved by the invention is that of reducing, or even suppressing, the vibration and flapping of the shutters in the locked position.

SUMMARY OF THE INVENTION

According to the invention, there is provided a device for closing and locking the shutters of an aircraft thrust reverser having a first part comprising a fixed structure, and a second part comprising at least one shutter, the closing and locking device comprising a lock integral with one of said first and second parts and a locking interface integral with the other of said first and second parts, said lock including a latch which is movable between an open position and a closed position wherein said latch interacts with said locking interface to keep said at least one shutter closed, and a motor which is linked to said latch in order to move said latch to said closed position at least, said latch being able to push against said locking interface during its movement towards said closed position so as to complete the closure of said at least one shutter utilizing energy supplied by said motor.

It will be appreciated that this device makes it possible to relieve the operating jack near the closed position of the shutter, that is to say at the moment when the jack would be required to supply the greatest traction force, thus solving the first problem.

The invention has the advantage of not requiring "over-retraction" of the shutter, which simplifies the geometry of the shutter and of the fixed structure, and makes it possible further to reduce the forces exerted on the shutter and the fixed structure upon closure.

A further advantage of the invention is that it allows an increase in the manufacturing tolerances of the reverser, both in the reverser production line and in the dimensions of the assembly comprising the lock, the fixed structure, the shutter and the locking interface, since the locking interface no longer has to move the latch of the lock into the closed position, which previously required precise spatial positioning of the latch and the locking interface.

Preferably, the motor is a rotary motor and drives the latch through a step-down transmission, that is to say a transmission which reduces the speed, so that a substantial force can be exerted on the latch by a small motor. The assembly is of small size, and the motor can thus be housed directly in the casing of the lock.

Furthermore, the transmission is preferably non-reversible, that is to say it transmits movement from the motor to the latch, but not from the latch to the motor, so as to oppose movement of the latch in a direction towards its open position under the effect of the reaction exerted by the locking interface on the latch. Such a transmission may be formed by a worm gear engaging with a toothed wheel, the worm gear being driven by the motor and the toothed wheel being coupled to the latch. Alternatively, the transmission may be formed by a screw which is arranged to drive a nut, the screw being driven by the motor and the nut being coupled to the latch.

Preferably, the device will include a detector for detecting the presence of the locking interface facing the latch, the motor being controlled to drive the latch to the closed position in response to a signal from the detector. This has the effect of making the closing of the latch subject to the presence of the locking interface, and has the result of preventing the latch being closed in the event of an anomaly having prevented the shutter coming near to its closed position.

This arrangement avoids the necessity of synchronizing the movement of the shutter and the closing of the lock, and consequently allows the manufacturing tolerances to be further widened.

Preferably, the device will also include a detector for detecting when the latch is in its closed position, this detector causing the motor to stop when the latch reaches the closed position. Stopping the motor has the effect of stopping the latch being driven towards the closed position, with the result that heating of the motor, and wasteful consumption of energy are prevented.

Preferably, the closed-position detector is operative to reactivate the motor if the latch moves away from the closed position, so that the motor will drive the latch back into the closed position. This makes it possible to close the latch again when it tends to open accidentally, for example following a slippage of the transmission between the motor and the latch. The security of the locking is consequently enhanced.

Preferably, a signalling device, such as a pilot light on the aircraft's instrument panel, will be connected to the closed position detector so as to indicate the correct closing of the lock. Such a signalling arrangement has the advantage of being very reliable, since it is controlled by the actual closing of the lock, and not by the order for the closing.

Also, with the motor being actuated to close the latch in response to a detector detecting the presence of the locking interface as described earlier, a signalling device, such as a pilot light on the aircraft's instrument panel, may be connected to the detector for detecting the closed position of the latch in order to indicate the closing of the latch on the locking interface. It will be understood that the combination of the detector detecting the presence of the locking interface, the detector detecting the closed position of the latch, and the signalling device makes it possible to verify the actual locking of the shutter on the fixed structure, with no possibility of error.

In one particular embodiment of the invention, the device includes a stop which is integral with the assembly consisting of said one part of the reverser and the lock carried thereby and which is in opposition to the latch when it closes, and the assembly consisting of said other part of the reverser and the locking interface carried thereby includes a counter-stop which comes up against the said stop in the closed position of the shutter. This combination has the effect of immobilizing the shutter in its closed position by the combined action of the latch and of the opposing stop, with the result that vibration and flapping of the shutter are reduced.

It will be understood that the shutter is retained in the closed position by the combined action of two solid members, namely the latch and the stop in opposition to the latch, which allows the shutter to be immobilized and reduces vibration and flapping. In contrast, in the prior art, immobilization is imperfect since it is achieved by the combined action of the latch and the sealing gaskets between the shutter and the fixed structure, these gaskets being resilient.

It will also be understood that the shutter can be immobilized with a very small amount of play, or even none at all, since it is the latch itself which completes the shutter-closing movement by acting on the locking interface utilizing the energy supplied by the motor. Advantageously, the transmission between the motor and the latch may include a resilient element having sufficient stiffness such that a continuous thrust will be exerted on the latch, in the closing direction, when the latch is in the closed position. It will be understood that this continuous thrust is passed on via the locking interface and the counter-stop before being taken up by the stop, and thus keeps the shutter closed with no play and thereby completely suppressing vibration and flapping. The person skilled in the art will adjust the stiffness of the resilient element as a function of the level of forces generated between the locking interface and the latch by vibration and flapping of the shutter.

This resilient element also has the advantage of reducing the stresses imposed on the transmission and on the motor when the shutter is immobilized in the closed position, but before the closed-position detector has shut off the motor.

In a first embodiment, the stop is integral with that part of the reverser carrying the lock, for example the fixed structure, while the counter-stop is integral with the other part, which will be the shutter in this example. Preferably the stop will be located near the lock and the counter-stop near the locking interface, in order to reduce the torsional stresses imposed on the fixed structure and on the shutter.

However, in a preferred alternative embodiment, the stop is integral with the lock, and more specifically with its housing, so that the lock housing will take up directly the force exerted by the latch and taken up by the stop, thus relieving that part of the reverser carrying the lock, for example the fixed structure, of this force. This arrangement also has the advantage of requiring no modification of the part of the reverser which carries the lock.

Preferably, the counter-stop consists of the locking interface itself, while the latch and the stop form a catch which grips the locking interface between the latch and the stop. This arrangement has the result of not imposing on that part of the reverser carrying the locking interface the force exerted by the latch on the locking interface and taken up by the stop. It also has the advantage of requiring no modification of that part of the reverser which carries the locking interface.

In another embodiment of the invention, the latch has the form of a barrel pivotally mounted within a hook formed integrally with the housing of the lock, the barrel including a hollow central recess extended by a radial aperture which allows the locking interface to enter when the shutter reaches the closed position, whereupon rotation of the barrel acts to trap the locking interface in the hollow central recess. This arrangement has the advantage of trapping the locking interface within the lock and preventing any risk of releasing the locking interface to permit accidental opening of the shutter following deformation of the fixed structure resulting, for example, from the disintegration of a disk of the turboshaft engine.

Preferably, a resilient member pushes against the locking interface in the opening direction, so as to press the locking interface against the wall of the hollow central recess. This arrangement makes it possible to hold the shutter without play and, as a result, to suppress flapping of the shutter.

Further preferred features and advantages of the invention will become apparent from the following nonlimiting description with reference to the drawings.

DESCRIPTION OF THE PREFERRED EMBODIMENTS

Figure 1:
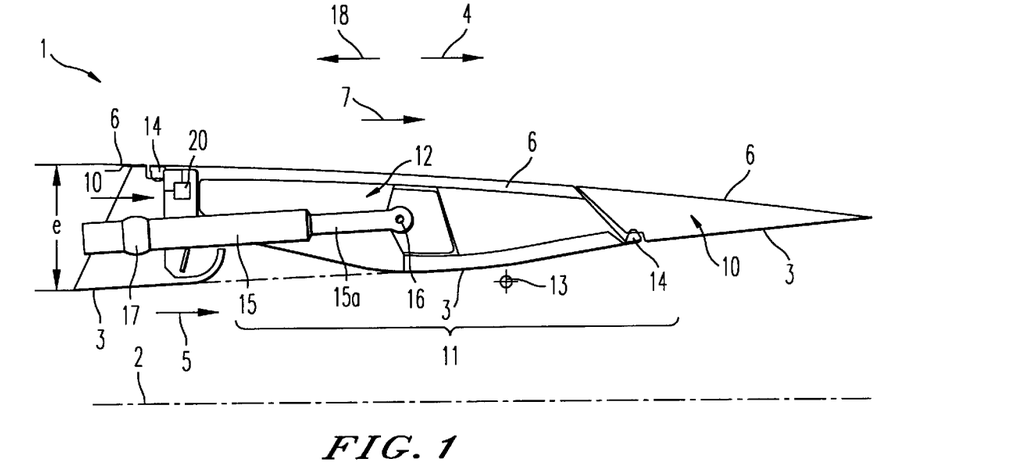
FIG. 1 is a diagram illustrating the general design of a thrust reverser in which the shutters are pivotally mounted on a fixed structure.

Referring first of all to FIG. 1, a thrust reverser 1 is shown in the form of a substantially annular structure which has a geometric axis 2 and which surrounds a turboshaft engine (not shown). The thrust reverser 1 comprises an inner wall 3 which channels in a rearward direction 4 the propulsion gases 5 generated by the engine, and an outer wall 6 over which flows the ambient air 7. The thrust reverser 1 also comprises a fixed structure 10, forming a first part, provided with a plurality of substantially radial through apertures 11, and shutters 12, forming a second part, which are mounted by pivots 13 on the fixed structure 10 and are arranged to close the apertures 11. In this type of reverser, the shutters 12 are also called "doors". Resilient sealing gaskets 14 are compressed between the periphery of each shutter 12 and the fixed structure 10.

Each shutter 12 is usually actuated, i.e. opened or closed, by a jack 15 having one end connected to the shutter 12 by a pivot 16, and the other end connected to the fixed structure 10 by a ball joint 17. When the shutters 12 are open, the flow of propulsion gases 5 passes outwards through the radial apertures 11 and is diverted in a forward direction 18 by the shutters 12 acting as deflectors, thus achieving the thrust reversal.

When each jack 15 closes its shutter 12, it has to exert a very substantial traction force for the following reasons, the effects of which are cumulative.

Firstly, because of the small thickness e of the reverser 1 between its inner wall 3 and its outer wall 6, the geometric axis 15a of the jack 15 approaches the geometric axis of the pivot 13, and for a constant traction force this results in a reduction in the closing torque transmitted by the jack 15 to the shutter or door 12. Secondly, the compressing of the sealing gaskets 14 demands an additional traction force from the jack 15, despite the jack being in the most unfavourable position for this purpose.

When the shutter 12 is fully closed, it is maintained in this position by a locking system 20 connecting the shutter 12 to the structure 10. The locking system 20 is usually, but not necessarily, arranged at the front of the shutter 12.

Figure 2:
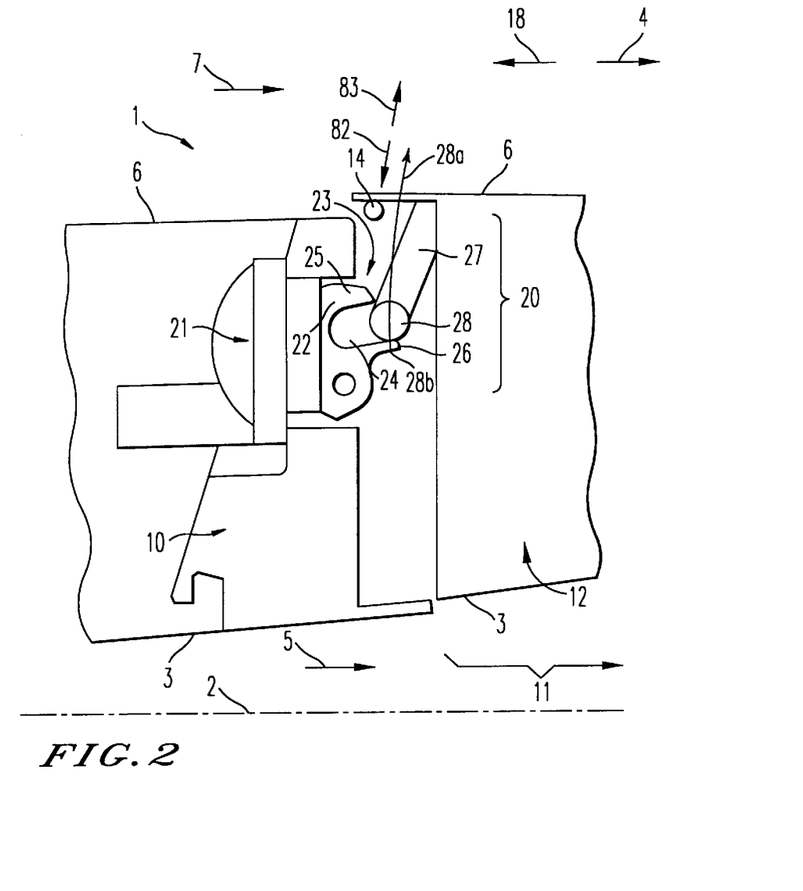
FIG. 2 is a diagram illustrating the construction and operation of a conventional form of lock, known as a "passive" lock, used in the type of reverser shown in FIG. 1.

Referring now to FIG. 2, the locking system 20 usually comprises a lock 21 which is integral with the fixed structure 10, the lock 21 comprising a pivotally mounted latch 22 terminating in a fork 23 defining a notch 24 between the upper prong 25 and the lower prong 26 of the said fork 23. The locking system 20 also comprises a tie rod 27 rigidly connected at one end to the shutter 12 and, at its other end, carrying a locking interface 28 which may be formed by a roller which is pivotally mounted on the tie rod. A trajectory 28a is given for the locking interface 28 as it nears the closed position, and an end 28b of the trajectory is shown as it moves into the closed position of the shutter.

Referring now simultaneously to FIGS. 1 and 2, when the shutter 12 is drawn towards the closed position by the traction exerted by the jack 15, the latch 22 initially has its notch 24 oriented so as to receive the locking interface 28. The locking interface 28 thus enters the notch 24 and bears on the lower prong 26, which has the effect of making the latch 22 pivot towards its closed position and bringing the upper prong 25 over the locking interface 28. A locking mechanism internal to the lock 21 maintains the latch 22 in this closed position. The traction force from the jack 15 is relaxed, and the shutter 12 tends to open under the effect of the pressure exerted by the propulsion gases 5, but is retained by the locking interface 28 bearing against the upper prong 25 of the fork 23 of the latch 22.

This arrangement has two drawbacks, however. In the first place, it requires great precision in the manufacture of the reverser, so that the locking interface 28 moves very accurately into the notch 24 and bears on the lower prong 26 so as to bring the latch 22 into the closed position. Secondly, when the engine is operating at low speed, the pressure of the propulsion gases 5 is low and may not be adequate to push against the shutter 12 sufficiently to keep the locking interface 28 bearing against the upper prong 25 of the latch 22. Because there is some play, particularly between the locking interface 28 and the prongs 25 and 26 of the latch 22, the shutter 12 then starts flapping, which causes hammering and wear of the latch 22 and of the locking interface 28, as well as accelerated fatigue of the fixed structure 10 and the shutters 12.

Figure 3:
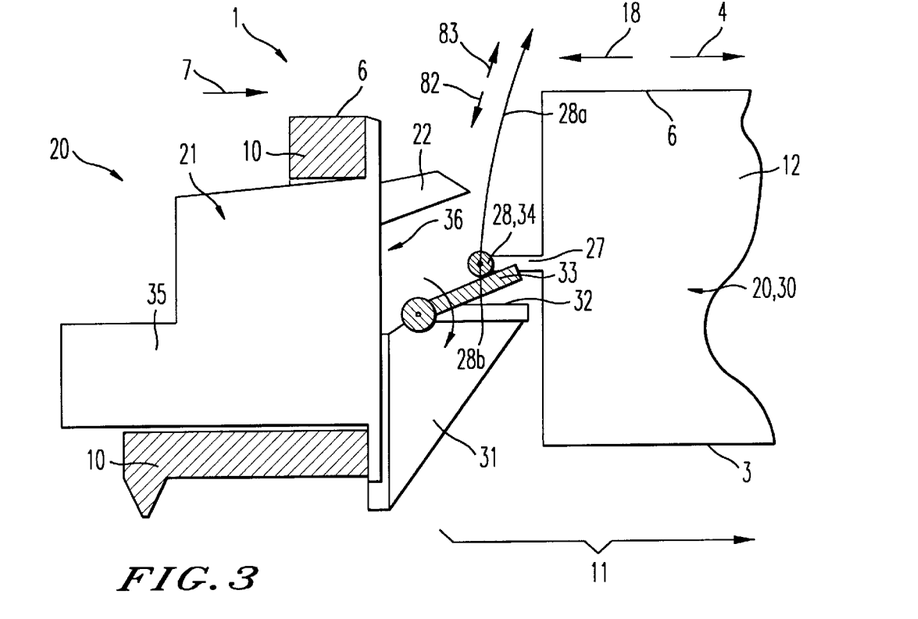
FIG. 3 illustrates diagrammatically one embodiment of a "catch" type closing and locking device in accordance with the invention.

Referring now to FIG. 3, a closing and locking device 30 in accordance with the invention is shown having the lock 21 integral with the fixed structure 10 and equipped with the latch 22 which is arranged to interact with the locking interface 28 integrally connected to the shutter 12 via a tie rod 27. A stop 31 which is integral with the lock 21 offers a bearing face 32 against which the locking interface 28 bears in the closed position of the shutter 12. The bearing face 32 is substantially orthogonal to the end of the trajectory 28a of the locking interface 28, and is situated facing the latch 22 and in opposition to the latch 22. When the shutter 12 approaches its closed position, the locking interface 28 approaches the bearing face 32 of the stop 31 and pushes against a pivoted lever 33 associated with an electrical micro-contact (not shown). This contact activates an electric motor which is arranged to drive the latch 22 towards the bearing face 32. The pivoted lever 33 associated with the micro-contact performs the role of a presence detector for the locking interface 28, and the movement of the motorized latch 22 towards the bearing face 32 brings the latch 22 into engagement with the locking interface 28 and pushes it down against the bearing face 32 of the stop 31, thereby bringing the shutter 12 to its fully closed position using the energy supplied by the motor, and allowing the jack 15 to be unloaded. Moreover, the locking interface 28 is clamped between the bearing face 32 of the stop 31 and the motorized latch 22, which makes it possible to maintain the locking interface 28 in position with a minimum of play and to reduce the flapping of the shutter 12 to a minimum. The invention also has the advantage of allowing precise positioning of the shutter 12 in its closed position, because the locking interface 28 is pressed against the stop 31 which is fixed.

The stop 31 may be replaced by a movable hook having the same action as the stop 31 on the locking interface 28, the direction of operation of this hook being opposed to that of the latch 22.

Figure 4:
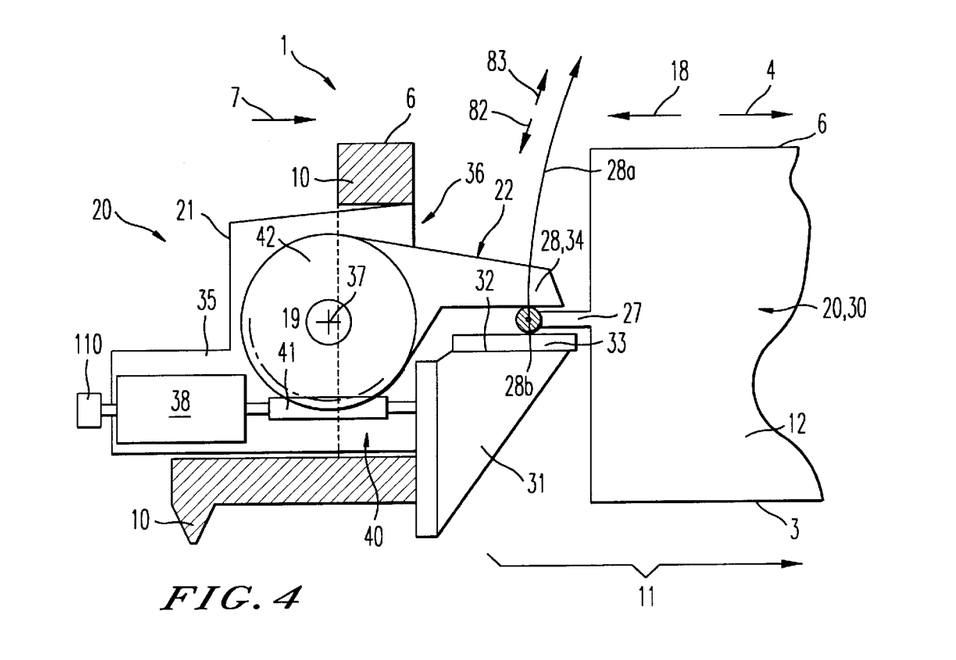
FIG. 4 illustrates diagrammatically the latch drive mechanism of the device of FIG. 3, with the latch shown in the closed and locked position.

The lock 21 may also include a system 110, as represented in FIG. 4, for measuring the forces transmitted by a motor 38 to the locking interface 28, so as to measure the force applied by the latch 22 on the locking interface 28. Such a measuring system may be purely electrical, for example by measuring the strength of the electric current consumed by the motor 38, or it may be mechanical. The use of such a system has two advantages:

a) it can be used to stop the motor 38 when the locking interface 28 is actually clamped between the latch 22 and the stop 31; and b) when combined with a signalling device for use by the pilot of the aircraft, it makes it possible to detect a breakage of the lock 21, particularly of the latch 22 or of a transmission 40, such breakage usually passing unnoticed when the aircraft is on the ground.

It will be noted that a counter-stop 34 in subsequent embodiments is constituted in this embodiment directly by the locking interface 28 which comes to bear against the bearing face 32 of the stop 31.

Referring now simultaneously to FIGS. 3 and 4, the lock 21, previously described only from the outside, comprises a housing 35 which is integrally connected to the fixed structure 10, the housing 35 having an aperture 36 through which passes the latch 22. The latch 22 is pivotally mounted within the housing 35 about a geometric pivot axis 37. The lock 21 also comprises the rotary electric motor 38 rigidly mounted in the housing 35 and electrically connected to the detector which senses the presence of the locking interface 28, the electric motor 38 being drivingly coupled to the latch 22 by the transmission 40 in order to actuate the latch 22. The transmission 40 in this embodiment comprises a worm gear 41 driven by the motor 38 and a toothed wheel 42 engaging with the worm gear 41, the toothed wheel 42 being coaxial with the pivot axis 37 of the latch 22 and coupled to the latch 22.

Figure 5:
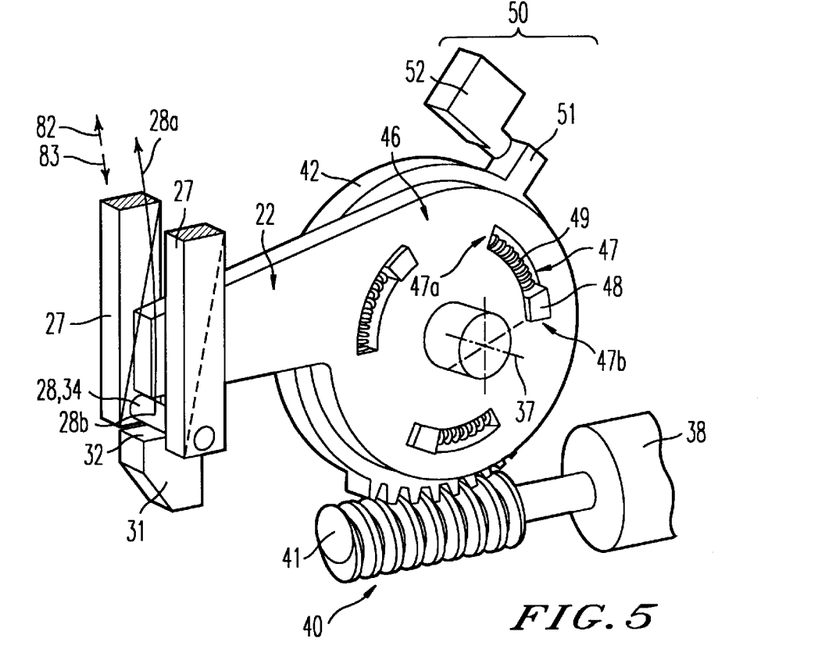
FIG. 5 illustrates diagrammatically one example of a worm driven transmission for the latch of a "catch" type closing and locking device in accordance with the invention.

Referring now to FIG. 5, the wheel 42 is shown having a toothed sector engaging with the worm gear 41, and a flexible coupling 45 connecting the wheel 42 to the latch 22. This coupling 45 comprises a plate 46 which is an integral part of the latch 22 and is centred on the geometric pivot axis 37 of the latch 22. The plate 46 lies against the toothed wheel 42, and is rotatable relative to the wheel 42 about the geometric axis 37. The plate 46 includes a plurality of slots 47 in the form of circular arcs centred on the geometric axis 37. The slot 47 has ends 47a and 47b in the closing direction and in the opening direction of the latch 22 respectively. The toothed wheel 42 has a plurality of studs 48 each penetrating into a respective slot 47, and a pre-compressed helical spring 49 is arranged in each of the slots 47 between the stud 48 and the end 47a in the closing direction.

The wheel 42 with the toothed sector also includes a radial stud 51 on its periphery, this stud 51 being arranged facing a microcontact 52 which is fixed to the housing 35, the stud 51 and the microcontact 52 forming a detector 50 for the closed position of the latch 22.

The assembly operates as follows to close the latch 22. Rotation of the motor 38 causes the worm gear 41 to drive the toothed-sector wheel 42, and the studs 48 on the wheel 42 act through the springs 49 to cause the latch 22 to turn towards the closed position, the latch 22 pushing the locking interface 28 against the bearing face 32 of the stop 31. When the locking interface 28 has come into contact with the stop 31, the pre-compressed springs 49 are compressed further, which allows the motor 38 to carry on driving the toothed-sector wheel 42 in rotation by means of the worm gear 41. The stud 51 then comes up against the microcontact 52, which cuts off the power supply to the motor 38. As the transmission 40 is not reversible, the toothed-sector wheel 42 is immobilized in its current position, and the locking interface 28 is kept bearing against the stop 31 by means of the latch 22 under the action of the thrust exerted by the springs 49 on the plate 46 integral with the latch 22. This arrangement makes it possible to apply pre-stressing to the locking interface 28. The worm gear 41 may be immobilized rotationally by any means known to a person skilled in the art when the latch 22 is in the closed position. The toothed-sector wheel 42 can also be immobilized rotationally in the closed position.

However, if no locking of the gear 41 or of the wheel 42 is envisaged, in the case where slippage in the opening direction occurs between the toothed sector of the wheel 42 and the worm gear 41, the wheel 42 starts backwards and moves the radial stud 51 away from the microcontact 52. This movement re-activates the motor 38 to restore the fully closed positions of the components. It will be noted that, throughout this time, the locking interface 28 is kept bearing against the stop 31 by the latch 22 under the action of the pressure from the springs 49.

Figure 6:
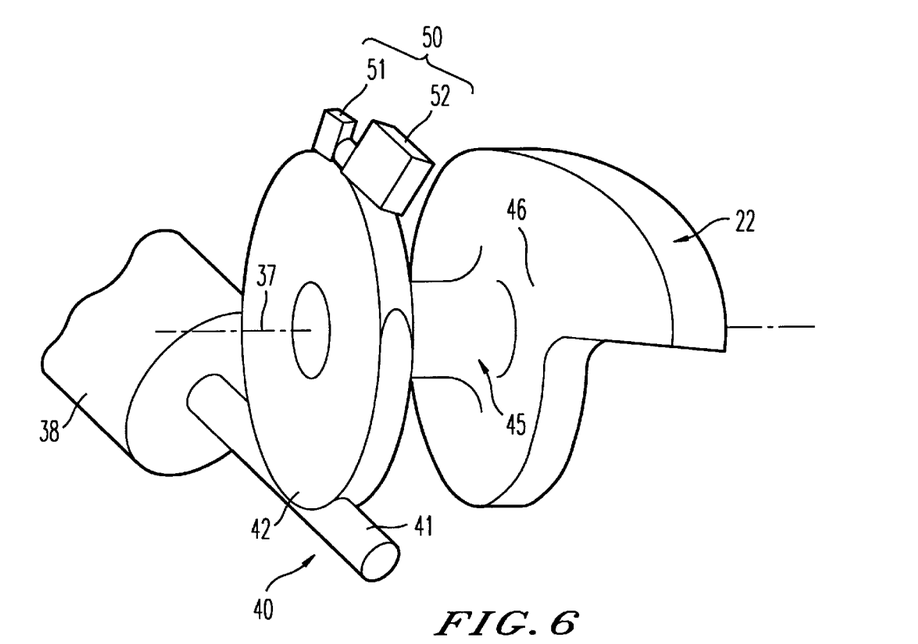
FIG. 6 illustrates diagrammatically a second example of a worm driven transmission for the latch of a "catch" type closing and locking device in accordance with the invention.

In an alternative arrangement shown in FIG. 6, a flexible coupling 45 is formed by a resilient block, for example of elastomeric, material integrally connected at one end to the toothed-sector wheel 42 and, at the other end, to the plate 46 of the latch 22.

Figure 7:
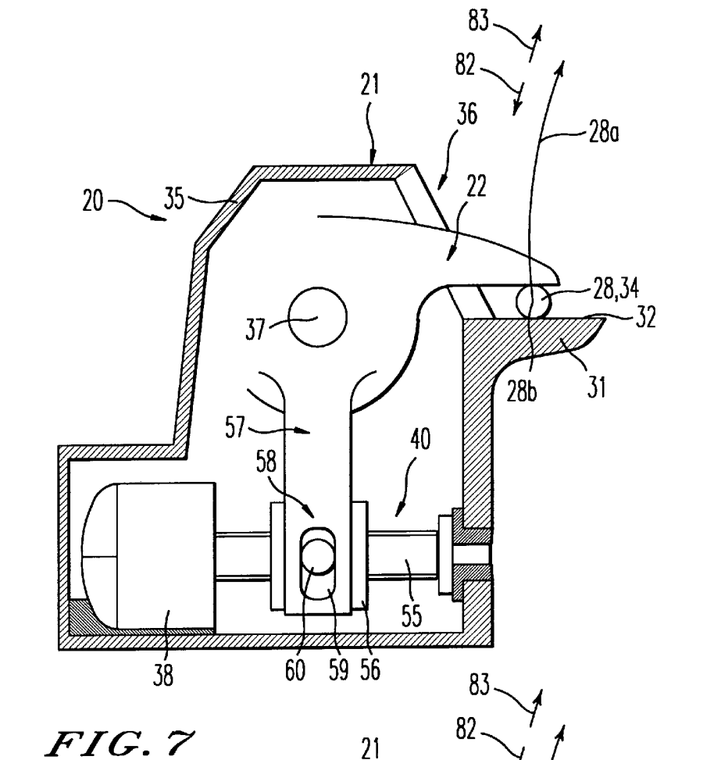
FIG. 7 illustrates diagrammatically another embodiment of a "catch" type closing and locking device in accordance with the invention, wherein the latch is driven through a screw and nut transmission.

Referring now to the embodiment shown in FIG. 7, the transmission 40 between the motor 38 and the latch 22 comprises a screw 55 driven by the motor 38, and a nut 56 which is screwed onto the screw 55 and which is coupled to an arm 57 having one end integral with the latch 22 and its other end defining a fork 58 which straddles the nut 56, each prong of the fork 58 having an oblong hole into which passes a stud 60 which is integral with the nut 56.

Figure 8:
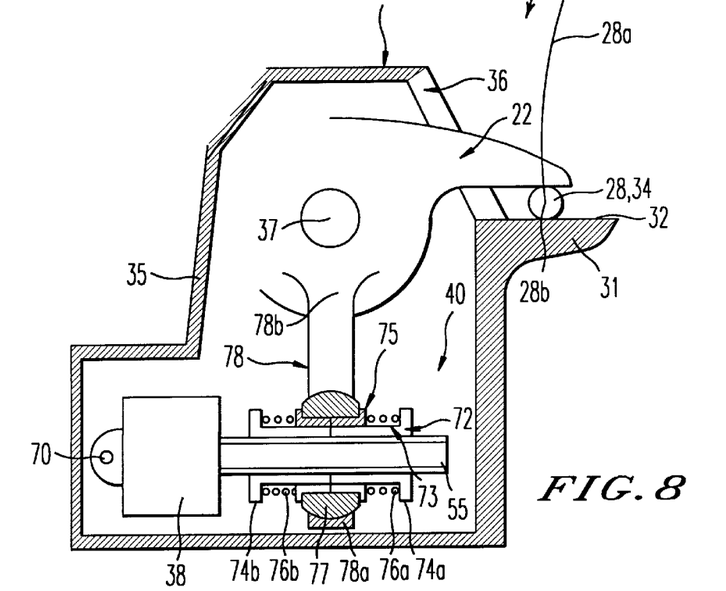
FIG. 8 is a view similar to FIG. 7 but illustrating an embodiment with an alternative form of screw and nut transmission.

In the embodiment of FIG. 8, the motor 38 is mounted so as to rock about a pivot 70 on the housing 35, and is arranged to drive a screw 55 on which a nut 72 is screwed. The nut 72 has a cylindrical outer bearing surface 73 flanked at opposite ends by shoulders 74*a* and 74*b*, and a slider 75 is mounted on the cylindrical bearing surface 73 between compression springs 76*a* and 76*b* which bear against the shoulders 74*a* and 74*b* respectively. The slider 75 supports a ball joint 77 which pivots at a free end 78*a* of an arm 78, the other end 78*b* of which is integral with the latch 22.

Figure 9:
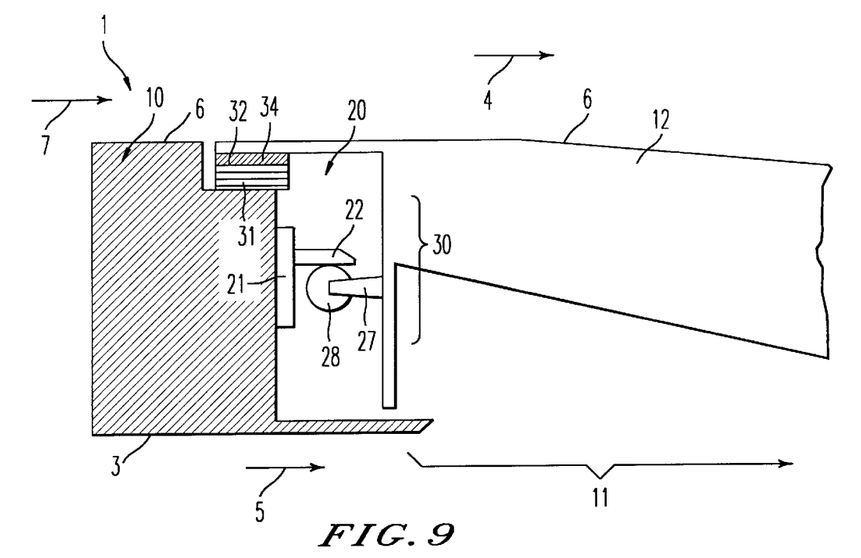
FIG. 9 illustrates diagrammatically an embodiment of a closing and locking device in accordance with the invention including a stop and a counter-stop separate from the lock and locking interface.

FIG. 9 illustrates an embodiment in which the locking interface 28 which is driven by the latch 22 of the lock 21 towards the closed position does not come into direct engagement with a stop. Instead, the stop 31 is arranged on the same part of the reverser as the lock 21, i.e. the fixed structure 10, the stop 31 having a bearing face 32 which acts in opposition to the latch 22, that is to say that it faces in the direction opposite to the direction of closing of the latch 22. The counter-stop 34 is provided on the shutter 12 in a position such that the counter-stop 34 comes up against the bearing face 32 of the stop 31 when the shutter 12 reaches the closed position under the action of the thrust exerted by the latch 22 on the locking interface 28.

Figure 10:
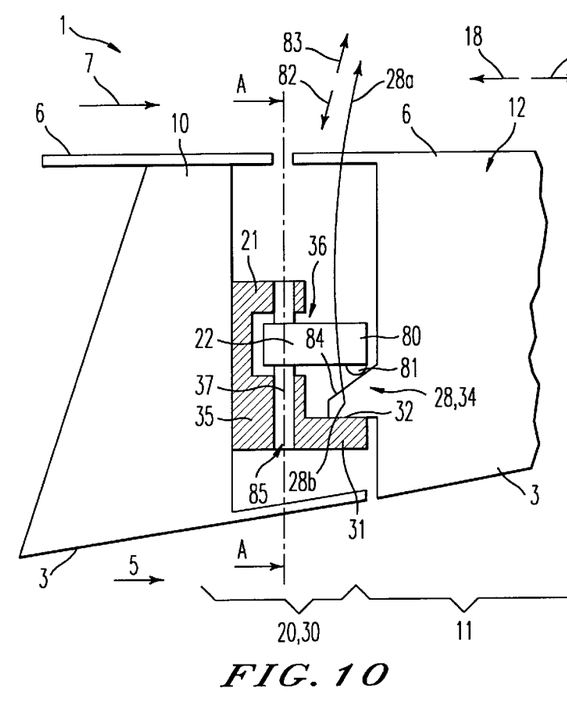
FIG. 10 illustrates diagrammatically an embodiment of a closing and locking device in accordance with the invention in which the locking interface is formed as a cam, part of the view being in section taken on line BB of FIG. 11.
Figure 11:
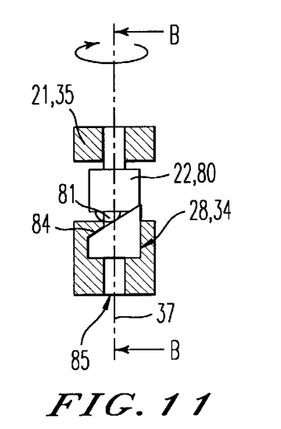
FIG. 11 is a part sectional view taken on line AA of FIG. 10 to illustrate the interaction of the latch with the locking interface in the closing and locking device.

In another embodiment illustrated in FIGS. 10 and 11, the latch 22 is mounted to pivot about the axis 37 which is substantially parallel to the trajectory 28*a* of the locking interface 28 as the shutter 12 nears its closed position. In the open position, the end 80 of the latch 22 is pivoted laterally clear of the bearing face 32 of the stop 31, and is driven back over the bearing face 32 in the closed position. The end 80 of the latch 22 has a projection 81 turned in a direction 82 of closing the shutter 12. The locking interface 28 has an oblique bearing surface 84 at its rear, that is to say facing in the direction 83 of opening the shutter 12, an oblique bearing surface 84 being substantially helical with respect to the geometric pivot axis 37 of the latch 22. When the shutter 12 is being closed, the latch 22 is initially in its open position. As the locking interface 28 approaches the bearing face 32 of the stop 31, the latch 22 is driven to pivot towards its closed position, and the projection 81, which describes a circular trajectory with respect to the pivot axis 37, comes into contact with the oblique bearing surface 84 at the rear of the locking interface 28 to exert a cam action which pushes the locking interface 28 down against the bearing face 32 of the stop 31. The rotation of the latch 22 towards the closed position may be stopped in a manner similar to that in the preceding embodiments. In this embodiment, the function of the counter-stop 34 is performed directly by the locking interface 28.

Because the slope of the oblique bearing surface 84 is reduced, the interaction between the projection 81 of the latch 22 and the oblique bearing surface 84 is not reversible. In other words, the locking interface 28 exerts on the latch 22, in the opening direction, a force which is taken up essentially by the pivots 85 connecting the latch 22 to the housing 35 along the pivot axis 37, this force not managing to make the latch 22 pivot in the opening direction because of the mechanical friction between the bearing surface 84 and the projection 81 of the latch 22. The transmission of the drive from the motor to the latch, not being shown in FIGS. 10 and 11, is consequently relieved, for all practical purposes, of the strain of keeping the latch 22 closed.

Figure 12:
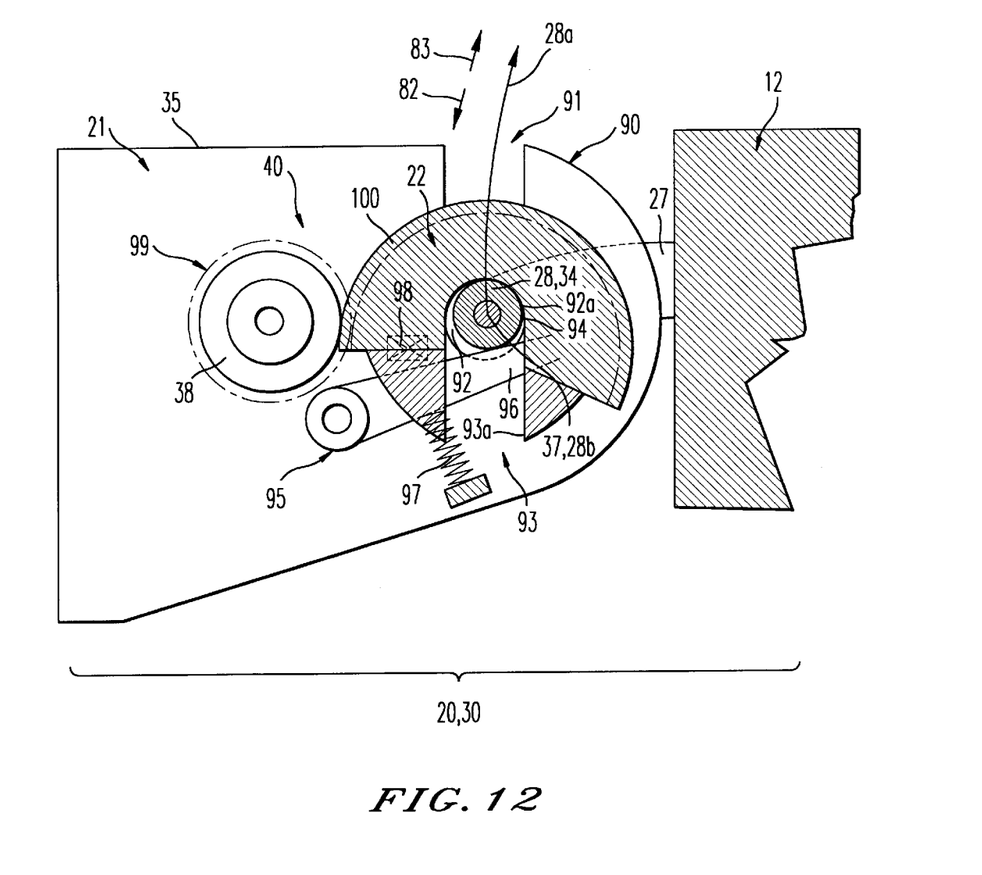
FIG. 12 illustrates diagrammatically another embodiment of a closing and locking device in accordance with the invention, in which the latch is of the "barrel" type.

Referring now to FIG. 12, an embodiment is shown in which the housing 35 of the lock 21 includes a protrusion in the form of a hook 90 having an opening 91 into which the locking interface 28 passes when it approaches the closed position along the trajectory 28*a*, said locking interface 28 being situated within the hook 90 in the closed position. The latch 22 is in the shape of a barrel and pivots in the hook 90 about the geometric pivot axis 37. The latch 22 has a cylindrical central recess 92 centred on the geometric pivot axis 37 and capable of accommodating the locking interface 28 when the shutter 12 is in its closed position. The locking interface 28 will preferably, but not necessarily, be a pivoted roller. The central recess 92 is extended radially outwards to the periphery of the latch 22 by a radial aperture 93 having a width which is greater than that of the locking interface 28 so that the latter can pass through it with clearance.

A wall 93*a* of the radial aperture 93 merges tangentially with a wall 92*a* of the central recess 92 along a straight line of intersection 94. Near this line of intersection 94, the wall 93*a* of the radial aperture 93 acts as a cam which causes the locking interface 28 to be pushed back into the central recess 92 of the latch 22 when the latter is rotated towards its closed position. The transmission 40 between the motor 38 and the latch 22 can be implemented in different ways. In the embodiment shown, the motor 38 is parallel to the pivot axis 37 of the latch 22 and drives the latch 22 by means of a pinion 99 which meshes with a toothed sector 100 on the periphery of the latch 22. The lock 21 also comprises a biasing device 95 consisting of a pivoted lever 96 which is biased by a spring 97 to a position where the lever 96 is contacted by the locking interface 28 towards the end of its travel towards the closed position, said lever 96 then exerting on the locking interface 28 a thrust in the opening direction 83. The biasing device 95, in conjunction with a microcontact 98 connected to the motor 38, acts as the detector for detecting the presence of the locking interface 28 near the closed position.

Preferably, the spring loading of the biasing device 95 is very soft at the start of the travel of the lever 96 and hard at the end of its travel. This difference enables the presence of the shutter 12 to be detected with a minimum reaction force, and subsequently ensures that the locking interface 28 is forced back against the wall 92*a* of the central recess 92 in the closed position.

The operation of the device is as follows, as far as the closing of the shutter 12 is concerned. The latch 22 is initially oriented so that its radial aperture 93 faces in the opening direction 83 in order to receive the locking interface 28. As the shutter nears its closed position, the locking interface 28 enters the radial aperture 93 of the latch 22 and comes into engagement with the pivoted lever 96. Under the pressure exerted by the locking interface 28 on the lever 96, the latter moves and closes the microcontact 98. This action triggers the motor 38 to rotate and thereby drive the latch 22 in rotation through about half a revolution by means of the pinion 99. As the latch 22 rotates, the wall 93a of the radial aperture 93 near the line of intersection 94 passes over the locking interface 28 and pushes it down towards the closed position, this movement of the locking interface 28 compressing the biasing spring 97 of the lever 96 still further. The rotation of the latch 22 continues until the line of intersection 94 and then the wall 92a of the central recess 92 pass over the locking interface 28 so that the interface 28 becomes trapped in the central recess 92. The motor 38 is then cut off by a detector, not represented, which detects when the latch 22 has reached the closed position in a manner equivalent to those which have already been explained in the previous embodiments.

It will be understood that the invention is not limited to the embodiments which have been described herein, but is intended to cover all the variants which could be applied to them without departing from the scope or spirit of the invention as defined by the claims hereinafter appearing.

For example, the lock 21 may be arranged on the shutter 12, and the locking interface 28 arranged on the fixed structure 10 by means of the tie rod 27. Such an arrangement can be achieved simply since the motor 38 is electric and the space inside the shutter 12 is not usually occupied. This arrangement has the advantage of not requiring hollow spaces to be provided in the fixed structure 10 in order to house the locks 21 therein, which makes it possible to increase the rigidity of the fixed structure 10 and to simplify its manufacture. In this case, the trajectory 28a of the locking interface 28 is the relative trajectory of the locking interface 28 with respect to the lock 21.

The orientation of the lock 21 in space is dependent on the trajectory 28a of the locking interface 28 and of the closing direction 82. In the embodiments which have been described and which relate to thrust reversers of the "door" type or of the "target" type, the direction of closing is centripetal. In the case of thrust reversers of the "scoop" type, the shutter 12 opens with a centripetal movement so as to cut off the flow of propulsion gases 5, and the closing direction 82 is centrifugal. In the case of the reversers called "cascade" reversers, the shutter 12 is a shroud surrounding the fixed structure 10 and subject to a translatory movement in the direction of the geometric axis 2. In this case, the trajectory 28a is parallel to the geometric axis 2 and the closing direction 82 is forwards from the rear direction 4.

We claim:

1. A closing and locking device for an aircraft thrust reverser, comprising:
    a first part being a fixed structure,
    a second part being at least one shutter,
    a lock integral with one of said first and second parts and a locking interface integral with the other of said first and second parts,
    a latch which is movable between an open position and a closed position wherein said latch interacts with said locking interface to keep said at least one shutter closed,
    a motor linked to said latch in order to move said latch to said closed position at least, said latch being able to push against said locking interface during movement towards said closed position so as to complete closure of said at least one shutter utilizing energy supplied by said motor,
    a stop which is integral with the first part and which opposes the latch, and
    a counter-stop which interacts with the stop so as to immobilize the second part in the closed position, thus reducing vibrating and flapping thereof.

2. A device according to claim 1, wherein said motor is a small rotary motor, and a step-down transmission is provided between said motor and said latch whereby said motor is able to generate a substantial force on said latch.

3. A device according to claim 2, wherein said transmission is nonreversible, so as to oppose movement of said latch in a direction towards said open position in response to a reaction exerted by said locking interface on said latch.

4. A device according to claim 3, wherein said transmission includes a worm gear and a wheel having a toothed-sector in engagement with said worm gear, said motor being drivingly coupled to said worm gear, and said wheel being coupled to said latch.

5. A device according to claim 3, wherein said transmission includes a screw and a nut in engagement with said screw, said motor being drivingly coupled to said screw, and said nut being coupled to the latch.

6. A device according to claim 1, further comprising a system for measuring the force transmitted by said motor to said locking interface in order to measure the force applied by said latch on said locking interface.

7. A device according to claim 1, further comprising a first detector for detecting the presence of said locking interface facing said lock, and said motor is controlled by said first detector to drive said latch towards said closed position in response to detection of the presence of said locking interface facing said lock.

8. A device according to claim 7, further comprising a second detector for detecting when said latch is in said closed position, said second detector causing said motor to stop and thereby halt movement of said latch when said latch reaches said closed position.

9. A device according to claim 8, wherein said second detector is operative to reactivate said motor if said latch moves away from said closed position, whereby said motor will drive said latch back into said closed position.

10. A device according to claim 8, further comprising a signalling device connected to said second detector to signal when said latch is in said closed position and said lock is correctly closed.

11. A device according to claim 1, further comprising:
    a first detector for controlling said motor to drive said latch towards said closed position in response to said first detector detecting the presence of the locking interface facing said lock,
    a second detector for detecting when said latch is in said closed position, and
    a signalling device connected to said second detector to signal when said latch is closed on the locking interface.

12. A device according to claim 1, wherein said lock includes a housing defining a hook integral therewith, and said latch is in the form of a latch barrel pivotally mounted within said hook and including a hollow central recess extended by a radial aperture which allows said locking interface to pass when the latch barrel is in said open position, said locking interface being trapped within said hollow central recess by rotation of said latch barrel into said closed position.

13. A device according to claim 12, including a resilient member which is engaged by said locking interface when moving into said hollow central recess and which biases said locking interface in a direction away therefrom.

14. A device according to claim 13, wherein said resilient member cooperates with a microcontact to form a detector for detecting the presence of said locking interface and actuating said motor to drive said latch to said closed position.

15. A device according to claim 14, wherein said resilient member is very flexible at the start of its travel and is stopped at the end of said travel.

16. A closing and locking device for an aircraft thrust reverser, comprising:

- a first part being a fixed structure,
- a second part being at least one shutter,
- a lock integral with one of said first and second parts and a locking interface integral with the other of said first and second parts,
- a latch which is movable between an open position and a closed position wherein said latch interacts with said locking interface to keep said at least one shutter closed,
- a motor linked to said latch in order to move said latch to said closed position at least, said latch being able to push against said locking interface during movement towards said closed position so as to complete closure of said at least one shutter using energy supplied by said motor,
- a stop which is integral with the first part and with said lock carried thereby and which acts in opposition to said latch when it is closed, and
- a counter-stop which comes up against said stop in said closed position of said latch so as to immobilize said at least one shutter in the closed position by combined action of said latch and said stop in opposition thereto.

17. A device according to claim 16, further comprising a transmission provided between said motor and said latch, said transmission including an elastic element of sufficient stiffness such that a continuous thrust is exerted on the latch in the closing direction when the latch is in said closed position.

18. A device according to claim 16, wherein said counter-stop is integral with said second part.

19. A device according to claim 18, wherein said stop is near said lock, and said counter-stop is near said locking interface so as to reduce the torsional stresses imposed on said fixed structure and said at least one shutter.

20. A device according to claim 16, wherein said lock includes a housing and said stop is integral with the lock housing whereby the force exerted by the latch is taken up directly by said housing.

21. A device according to claim 20, wherein said counter-stop consists of said locking interface itself and is gripped between said latch and said stop in said closed position.

22. A device according to claim 16, wherein said latch is pivotally mounted about a pivot axis which is substantially parallel to a relative trajectory of said locking interface near said closed position, and said locking interface has an oblique bearing surface at its rear which is substantially helical with respect to said pivot axis of said latch such that said latch bears on said oblique bearing surface as it moves into said closed position.

* * * * *